US012186927B1

(12) United States Patent
Meng et al.

(10) Patent No.: US 12,186,927 B1
(45) Date of Patent: Jan. 7, 2025

(54) CUTTING TOOL

(71) Applicant: Cricut, Inc., South Jordan, UT (US)

(72) Inventors: Qionghe Meng, South Jordan, UT (US); Kurt Stalsberg, Salt Lake City, UT (US)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 18/442,755

(22) Filed: Feb. 15, 2024

Related U.S. Application Data

(63) Continuation of application No. 18/336,710, filed on Jun. 16, 2023, now Pat. No. 11,938,646.

(51) Int. Cl.
*B26D 1/04* (2006.01)

(52) U.S. Cl.
CPC .................................... *B26D 1/04* (2013.01)

(58) Field of Classification Search
CPC ........ B26D 1/04; B26D 1/045; B26D 1/0006; B26D 1/006; B26D 2007/2678; B26D 2001/0053
See application file for complete search history.

(56) References Cited

U.S. PATENT DOCUMENTS

2011/0280999 A1* 11/2011 Crystal .................... B26D 7/26 426/302

FOREIGN PATENT DOCUMENTS

KR 20120076998 A 7/2012

* cited by examiner

*Primary Examiner* — Jennifer S Matthews

(57) ABSTRACT

A cutting tool may comprise a blade portion forming a distal end of the cutting tool. The blade portion may comprise a knife edge, and this knife edge may be defined by a grind surface. The blade portion may further include a chamfer surface that intersects the grind surface. The grind surface may be planar and/or the chamfer surface may be planar. A first exterior surface angle, defined as an external angle between respective outwardly facing surfaces of the grind surface and the chamfer surface, may be between about 210 degrees and about 270 degrees.

13 Claims, 6 Drawing Sheets

CUTTING TOOL

CROSS REFERENCE TO PRIOR APPLICATIONS

This U.S. Patent application is a continuation of, and claims priority under 35 U.S.C. § 120 from U.S. patent application Ser. No. 18/336,710, filed Jun. 16, 2023. The disclosure of this prior application is considered part of the disclosure of this application and is hereby incorporated by reference in its entirety.

FIELD

This invention relates to cutting tools, and more particularly relates to cutting blade geometries.

BACKGROUND

Conventional cutting tools generally include a sharp edge for cutting through materials. For example, an electronic crafting machine may controllably move a blade across/through a workpiece material to cut a design into the workpiece material. However, as a cutting tool is repeatedly used, the blade may experience wear and tear and may be damaged. Damaged blades may result in substandard cuts and may otherwise negatively affect the cutting performance of the tool.

SUMMARY

The subject matter of the present disclosure has been developed in response to the present state of the art, and in particular, in response to the problems and needs in the art that have not yet been fully solved by currently available cutting tools. Accordingly, the present disclosure has been developed to provide a cutting tool that overcomes many or all of the above-discussed shortcomings in the art, in accordance with various embodiments.

Disclosed herein, according to various embodiments, is a cutting tool. The cutting tool may comprise a blade portion forming a distal end of the cutting tool. The blade portion may comprise a knife edge, and this knife edge may be defined by a grind surface. The blade portion may further include a chamfer surface that intersects the grind surface. In various embodiments, the grind surface is planar. In various embodiments, the chamfer surface is planar. In various embodiments, a first exterior surface angle, defined as an external angle between respective outwardly facing surfaces of the grind surface and the chamfer surface, is between about 210 degrees and about 270 degrees.

In various embodiments, the grind surface is a first grind surface and the blade portion further comprises a second grind surface. The first grind surface and the second grind surface together define the knife edge, according to various embodiments. A second exterior surface angle, defined as an external angle between respective outwardly facing surfaces of the first grind surface and the second grind surface, may be between about 300 degrees and about 345 degrees. In various embodiments, the chamfer surface is a first chamfer surface and the blade portion further comprises a second chamfer surface that intersects the second grind surface. A third exterior surface angle, defined as an external angle between respective outwardly facing surfaces of the first chamfer surface and the second chamfer surface, may be between about 240 degrees and about 300 degrees.

In various embodiments, at least a portion of the first chamfer surface and at least a portion of the second chamfer surface do not intersect each other such that a back side of the blade portion of the cutting tool comprises a first spine section disposed between said portion of the first chamfer surface and said portion of the second chamfer surface. The first spine section may have a curved exterior surface. The back side of the blade portion of the cutting tool may include a second spine section disposed between the first spine section and a tip of the blade portion.

In various embodiments, the blade portion of the cutting tool comprises a cylindrical ricasso. The cutting tool may have a longitudinal centerline axis and the blade portion of the cutting tool comprises a tip that is a distal-most point of the cutting tool. The knife edge may extend in a straight line between the tip and a choil. In various embodiments, a back edge of the blade portion extends in a straight line from the tip backwards and a back edge angle, defined as an angle between the longitudinal centerline axis and the back edge, is between about 5 degrees and about 25 degrees. In various embodiments, a tip angle, defined between the knife edge and the back edge, is between about 75 and about 35 degrees.

In various embodiments, a first height of the knife edge, defined as a dimension of the knife edge along the longitudinal centerline axis, is between about 50% and about 150% of a largest cross-sectional dimension of a ricasso of the blade portion of the cutting tool. In various embodiments, a second height of the back edge, defined as a dimension of the back edge along the longitudinal centerline axis, is between about 20% and about 50% of the largest cross-sectional dimension. In various embodiments, the second height is less than 50% of the first height. In various embodiments, a third height of the chamfer surface, defined as a dimension of the chamfer surface along the longitudinal centerline axis, is between about 70% and about 100% of the largest cross-sectional dimension. In various embodiments, the third height is less than the first height but more than 50% of the first height.

Also disclosed herein, according to various embodiments, is a crafting apparatus (e.g., an electronic cutting apparatus) comprising various features of the cutting tool. Also disclosed herein, according to various embodiments, is a method of using the cutting tool in a crafting apparatus. In various embodiments, the method may include dragging the knife edge of the cutting tool through a material to implement a design into the material, according to various embodiments.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the disclosure, other embodiments may be realized and logical changes and adaptations in design and construction may be made in accordance with this disclosure without departing from the spirit and scope of the disclosure. Thus, the detailed description herein is presented for purposes of illustration only and not of limitation.

Disclosed herein, according to various embodiments, is a cutting tool that has a blade portion with an improved geometric configuration that improves the durability of the cutting tool. Although numerous details and examples are included herein pertaining to the cutting tool being used in conjunction with a crafting machine (such as an electronic cutting machine), the present disclosure is not necessarily so limited, and thus aspects of the disclosed embodiments may be adapted for performance in a variety of other industries. As such, numerous applications of the present disclosure may be realized.

Figure 1:
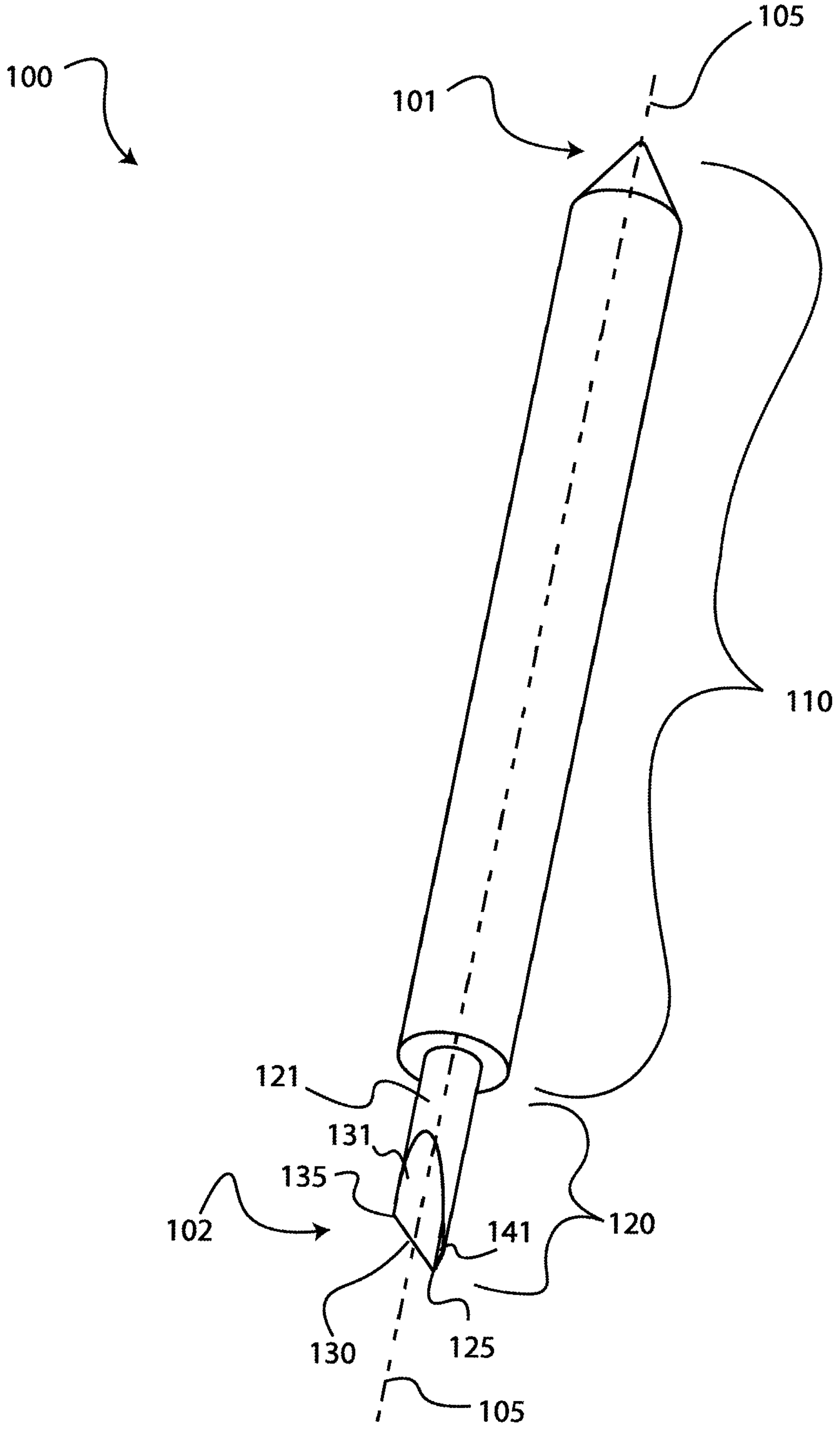
FIG. 1 is a perspective view of a cutting tool, in accordance with various embodiments.
Figure 2:
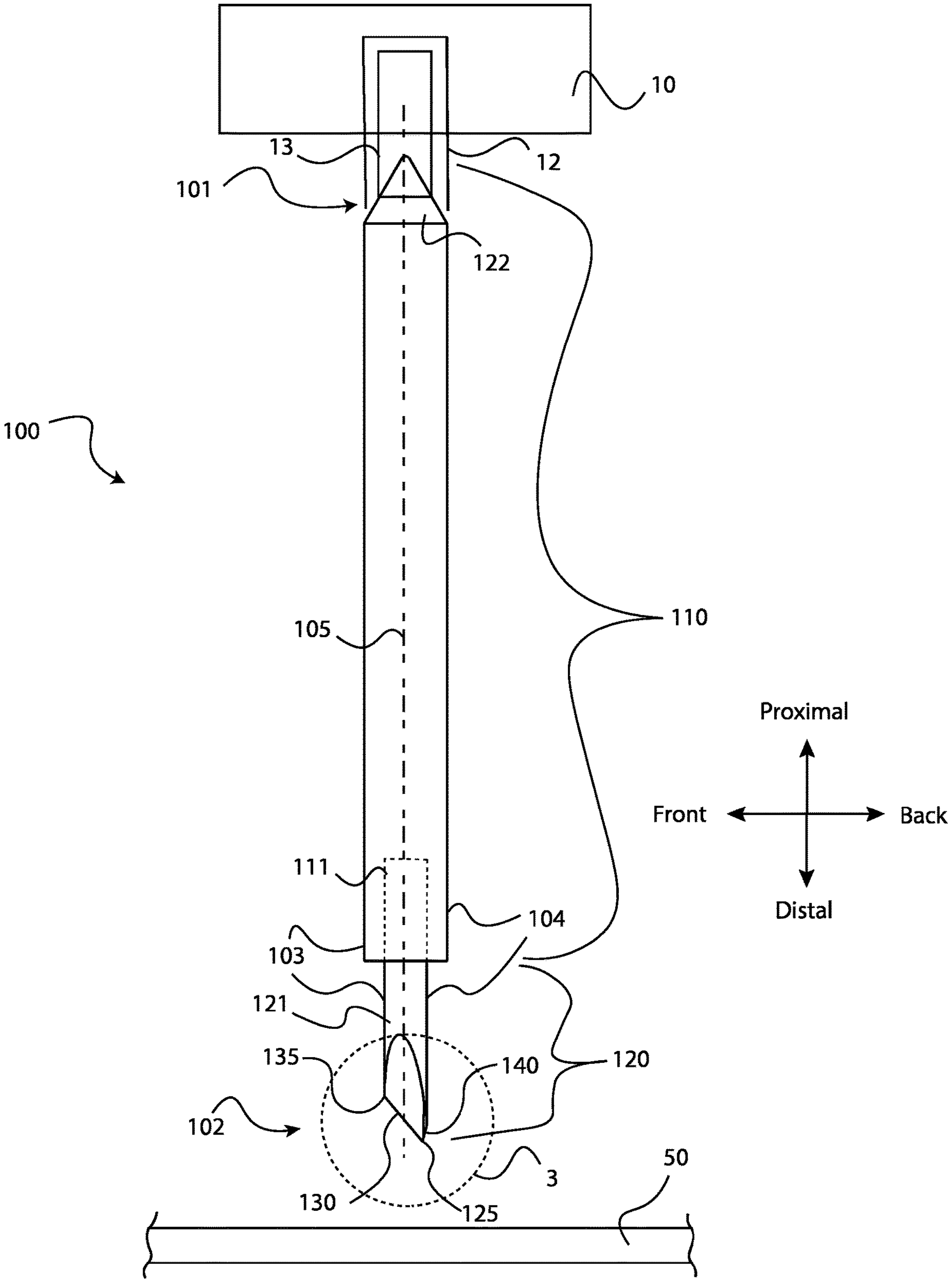
FIG. 2 is a side view of the cutting tool attached to a crafting apparatus, with an exemplary workpiece also provided, in accordance with various embodiments.

In various embodiments, and with reference to FIGS. 1 and 2, a cutting tool 100 is provided. The cutting tool 100 may generally include a stem portion 110 and a blade portion 120. The stem portion 110 may form a proximal end 101 (e.g., a proximal portion) of the cutting tool 100 and the blade portion 120 may form a distal end 102 (e.g., a distal portion) of the cutting tool 100. The stem portion 110 may be a shank, handle, and/or overmold portion. The stem portion 110 may be the portion of the cutting tool 100 that is held by a user or that is attached to a machine during use. For example, the stem portion 110 may be the portion of the cutting tool 100 that is retained by, coupled to, and/or otherwise attached to a crafting apparatus 10 (FIG. 2), as explained in greater detail below.

The blade portion 120 may comprise a tang 111 (FIG. 2) that is retained within the stem portion 110, thereby providing secure attachment of the blade portion 120 to the stem portion 110. In various embodiments, the blade portion 120 generally includes a knife edge 130 defined by at least one grind surface 131, and the blade portion 120 may also include at least one chamfer surface 141 that intersects the grind surface 131. While many additional details regarding the blade portion 120, and specifically the geometry of the chamfer surface(s) 141 relative to the knife edge 130 and the grind surface(s) 131, are provided below, the chamfer surface(s) 141 is configured to impart strength and/or durability to the cutting tool 100, thereby extending the useful life of the tool. Further, as noted below, the blade portion 120 of the cutting tool 100 may include a single grind surface 131 or multiple grind surfaces 131, 132 that collectively define the knife edge 130. Similarly, the blade portion 120 of the cutting tool 100 may include a single chamfer surface 141 or multiple chamfer surfaces 141, 142. Accordingly, unless expressly stated otherwise, embodiments and references to "a," "the," or "one" grind surface or chamfer surface are not necessarily limited to a single respective surface, but instead such embodiments may have multiple grind surfaces and/or multiple chamfer surfaces.

The cutting tool 100 may be a directional cutting tool, and thus may be configured with a front side 103 that generally faces the intended direction of travel of the cutting tool 100 during use, and a back side 104 opposite the front side 103. In various embodiments, the knife edge 130 is angled, as described below, such that the knife edge 130 is facing forward and distally. In use, the cutting tool 100 is configured to be dragged by a user or a machine in a forward direction such that at least a portion of the knife edge 130 at least partially cuts through a workpiece 50. Said differently, the blade portion 120 of the cutting tool 100 may be designed as a wedge blade. The blade portion 120 may be made from carbide material, such as a tungsten carbide material, according to various embodiments, and the grind surface(s) 131 and chamfer surface(s) 141 may be formed by stamping, grinding, or other suitable methods.

In various embodiments, the blade portion 120 comprises a ricasso 121. The knife edge 130 may be defined by one or more grind surfaces 131 that taper the ricasso 121 to the knife edge 130. The ricasso 121 may be cylindrical, and thus the one or more grind surfaces 131 may taper/transition from the rounded exterior surfaces of the ricasso 121 to the knife edge 130. In various embodiments, the cross-sectional dimension 122 (FIG. 3) of the ricasso 121 (e.g., the diameter of a cylindrical ricasso) is between about 0.25 mm and about 2.0 mm. In various embodiments, the cross-sectional dimension 122 of the ricasso 121 is between about 0.5 mm and about 1.5 mm. In various embodiments, the cross-sectional dimension 122 of the ricasso 121 is about 1.0 mm.

Figure 3:
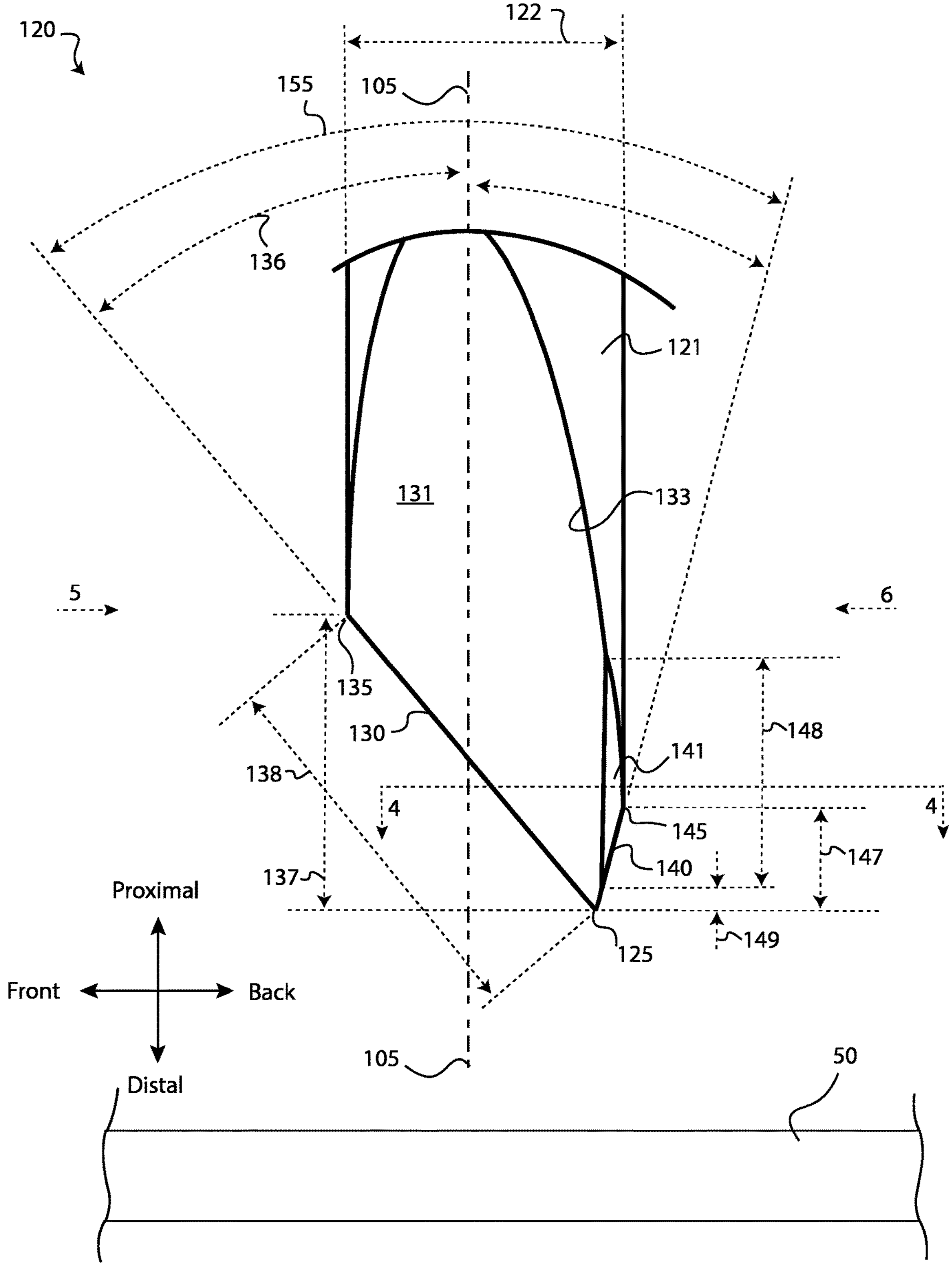
FIG. 3 is a magnified view of the blade portion in the area labeled "3" of FIG. 2, in accordance with various embodiments.
Figure 4:
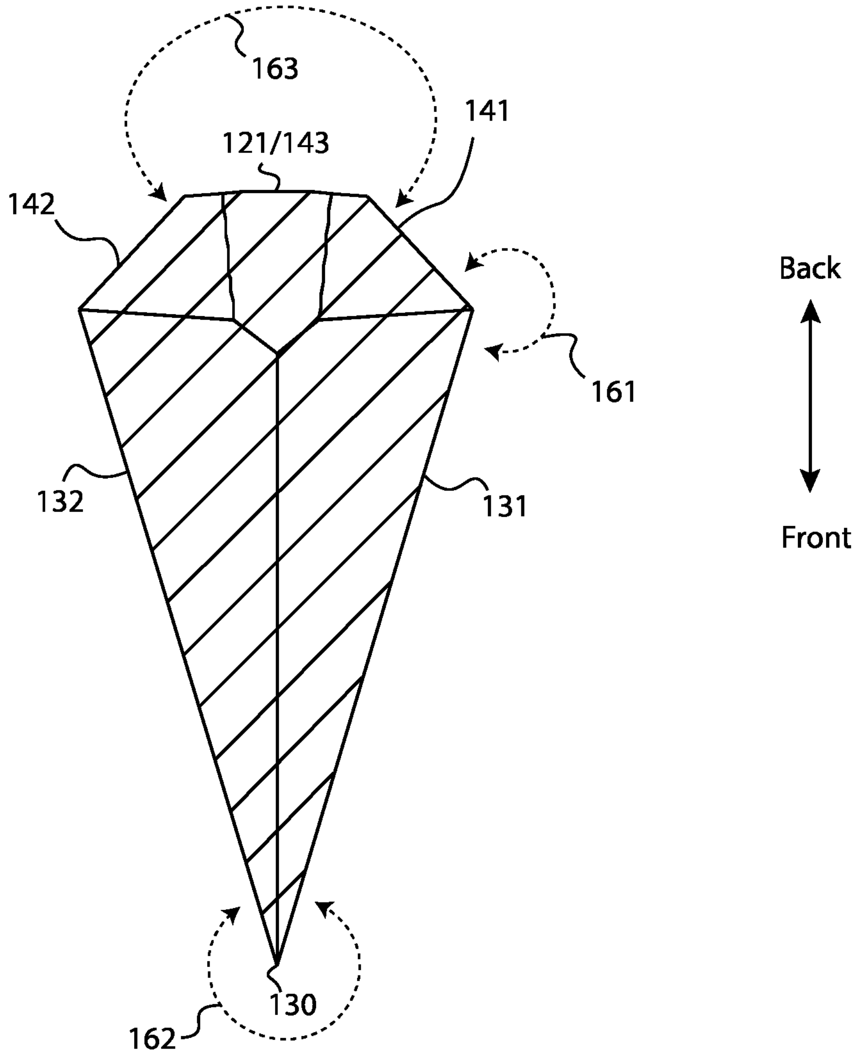
FIG. 4 is a cross-sectional view of the blade portion of the cutting tool, as observed from the section line labeled "4" in FIG. 3, in accordance with various embodiments.

In various embodiments, the cutting tool 100 also includes a longitudinal centerline axis 105. The aforementioned cross-sectional dimension 122 of the ricasso 121 may be defined as the largest dimension of the ricasso 121 as measured along a straight line that is perpendicular to the longitudinal centerline axis 105 of the cutting tool 100. As explained below, various features, orientations, dimensions, and configurations are defined relative to the longitudinal centerline axis 105 of the cutting tool 100. FIGS. 2, 3, and 4 include one or more directional arrows labeled "proximal," "distal," "front," and "back." These terms, as well as corresponding synonyms, are generally used throughout the present application to describe the relative position and/or orientation of various components. That is, these terms are relative positional terms, and the positional arrows are not intended to represent a coordinate system and do not show a zero-zero position. In other words, if element A is described herein as being rearward or behind element B, then element A is farther along the "back" direction from element B. Similarly, if element X is positioned distally from element Y, then element X is displaced a distance in the "distal" direction from element Y.

In various embodiments, and with reference to FIGS. 2 and 3, the cutting tool 100 may be utilized in conjunction with a crafting apparatus 10 (shown schematically as a block diagram in FIG. 2). The crafting apparatus 10 may be generally configured to conduct "work" upon a workpiece 50. In various embodiments, the workpiece 50 may be at least partially disposed within the crafting apparatus 10 in order to permit the crafting apparatus 10 to not only controllably move the cutting tool 100 but to also controllably move the workpiece 50, thus enabling the crafting apparatus 10 to engender relative motion between the cutting tool 100 and the workpiece 50 in order to conduct work on the workpiece 50. In various embodiments, crafting apparatus 10 may include a tool housing 12, or other intermediary fixtures or components, to facilitate coupling of the cutting tool 100 to the crafting apparatus 10. In various embodiments, the tool housing 12 enables reversible (e.g., detachable) attachment of the cutting tool 100 to the machine.

With specific reference to FIG. 2, the proximal end 101 of the cutting tool 100 (i.e., the proximal portion of the stem portion 110) comprises a conical bearing feature 112 that is configured to engage a bearing portion 13 of the tool housing 12. This engagement between the conical bearing feature 122 and the bearing portion 13 of the tool housing 12 enables the cutting tool 100 to rotate (e.g., about its longitudinal centerline axis 105) during use while also enabling the cutting tool 100 to be axially seated and axially supported against the bearing portion 13 of the tool housing 12 during use to ensure a known and constant distance between the tool housing 12 and the tip 125 of the tool.

In various embodiments, the crafting apparatus 10 includes a carriage that is movably disposed upon a member such as a rod, bar, or shaft. The movement of the carriage along the rod may be controlled by a motor (not shown) that receives actuation signals from a controller (e.g., a central processing unit or CPU). The controller may be a component of the crafting apparatus 10, the controller may be associated with a laptop computer (or other computing device of a user) and/or a remote server that is communicatively coupled to the crafting apparatus 10. In various embodiments, the carriage of the crafting apparatus 10 is configured to move the cutting tool 100 along two axes of movement (i.e., side-to-side motion and vertical motion) while a roller mechanism or other conveyer mechanism of the crafting apparatus 10 is configured to move the workpiece 50 in a forward-and-backward motion. BDuring use, the crafting apparatus 10 may controllably cause at least a portion of the blade portion 120 (i.e., the tip 125) to at least partially penetrate the workpiece 50 and then commence the controlled movement of the cutting tool 100 relative to the workpiece 50 to perform work upon the workpiece 50.

In various embodiments, the workpiece 50 includes any desirable shape, size, geometry or material composition. The shape/geometry may include, for example, a square or rectangular shape. Alternatively, the shape may include non-square or non-rectangular shapes, such as circular shapes, triangular shapes or the like. The composition of the workpiece 50 may include paper-based materials (e.g., paperboard or cardboard), non-paper-based materials (e.g., vinyl, foam, rigid foam, cushioning foam, or the like), and/or other materials, such as organic materials (e.g., tissue). Nevertheless, although various implementations of workpiece material composition may be directed to paper, vinyl or foam-based products, the material composition of the workpiece 50 is not limited to a particular material and may include any cuttable material. In various embodiments, the workpiece 50 has a generally planar geometry (at least in the vicinity proximate the cutting activity).

In various embodiments, and with reference to the magnified view of the blade portion 120 of FIG. 3, the grind surface 131 is a tapered surface that transitions from the ricasso 121 (which may be cylindrical) to the knife edge 130. The grind surface 131 may be planar, or the grind surface may have a curved configuration (e.g., the grind surface may have a convex or a concave configuration). In various embodiments, the transition from the ricasso 121 to the grind surface 131 may be abrupt, and this abrupt transition may form a grind line 133. A forward end of the grind line 133, according to various embodiments, terminates at the choil 135 (i.e., the front end of the knife edge 130). The opposing end (i.e., the back end) of the grind line 133 may terminate at the chamfer surface 141. Said differently, the chamfer surface 141 intersects the grind surface 131 such that the chamfer surface 141 occupies the space where the back/rear grind line 133 would have continued down towards the tip 125 of the blade (if there were no chamfer surface). In various embodiments, and with momentary reference to the cross-sectional view of FIG. 4, the blade portion 120 may include two grind surfaces 131, 132 that collectively define the knife edge 130. Both grind surfaces 131, 132 may be intersected by respective chamfer surfaces 141, 142, as described in greater detail below.

In various embodiments, and with continued reference to FIG. 3, the distal-most portion/point of the cutting tool 100 is the tip 125, and the knife edge 130 extends forward from the tip 125 towards the choil 135. The knife edge 130 may be curved or may otherwise have a non-straight configuration. In various embodiments, the knife edge 130 is straight and extends in an angled orientation relative to the longitudinal centerline axis 105 of the cutting tool. For example, the knife edge 130 may extend (e.g., along a straight line) in a proximal-forward direction from the tip 125 of the blade. In various embodiments, the knife edge 130 extends at a knife edge angle 136 relative to the longitudinal centerline axis 105. This knife edge angle 136 may be between about 20 degrees and about 60 degrees. In various embodiments, the knife edge angle 136 is about 40 degrees. As used in this context pertaining to the knife edge angle, the term "about" means plus or minus 5 degrees.

In various embodiments, and with reference to FIG. 3, a first height 137 of the knife edge 130, which is defined as a dimension of the knife edge 130 along the longitudinal centerline axis 105, is between about 50% and about 150% of the cross-sectional dimension 122 of the ricasso 121 of the blade portion 120 of the cutting tool 100. In various embodiments, the first height 137 of the knife edge 130 is about 107% of said cross-sectional dimension 122. As used in this context pertaining to the first height 137 of the knife edge 130, the term "about" means plus or minus 10% of said cross-sectional dimension 122. In various embodiments, the first height 137 is between about 0.50 mm and about 1.50 mm. In various embodiments, the first height 137 of the knife edge 130 may be about 1.07 mm. As used in this context pertaining to the first height 137 of the knife edge 130, the term "about" means plus or minus 0.10 mm.

In various embodiments, a length 138 of the knife edge 130, as measured from the choil 135 to the tip 125, is between about 100% and about 200% of the cross-sectional dimension 122 of the ricasso 121 of the blade portion 120 of the cutting tool 100. In various embodiments, the length 138 of the knife edge 130 is between about 125% and about 160% of said cross-sectional dimension 122. In various embodiments, the length 138 of the knife edge 130 is about 140% of said cross-sectional dimension 122. As used in this context pertaining to the length 138 of the knife edge 130, the term "about" means plus or minus 5% of said cross-sectional dimension 122. In various embodiments, the length 138 of the knife edge 130, as measured from the choil 135 to the tip 125, is between about 1.0 mm and about 2.0 mm. In various embodiments, the length 138 of the knife edge 130 is between about 1.25 mm and about 1.60 mm. In various embodiments, the length 138 of the knife edge 130 is about 1.40 mm. As used in this context pertaining to the length of the knife edge 130, the term "about" means plus or minus 0.05 mm.

Figure 6:
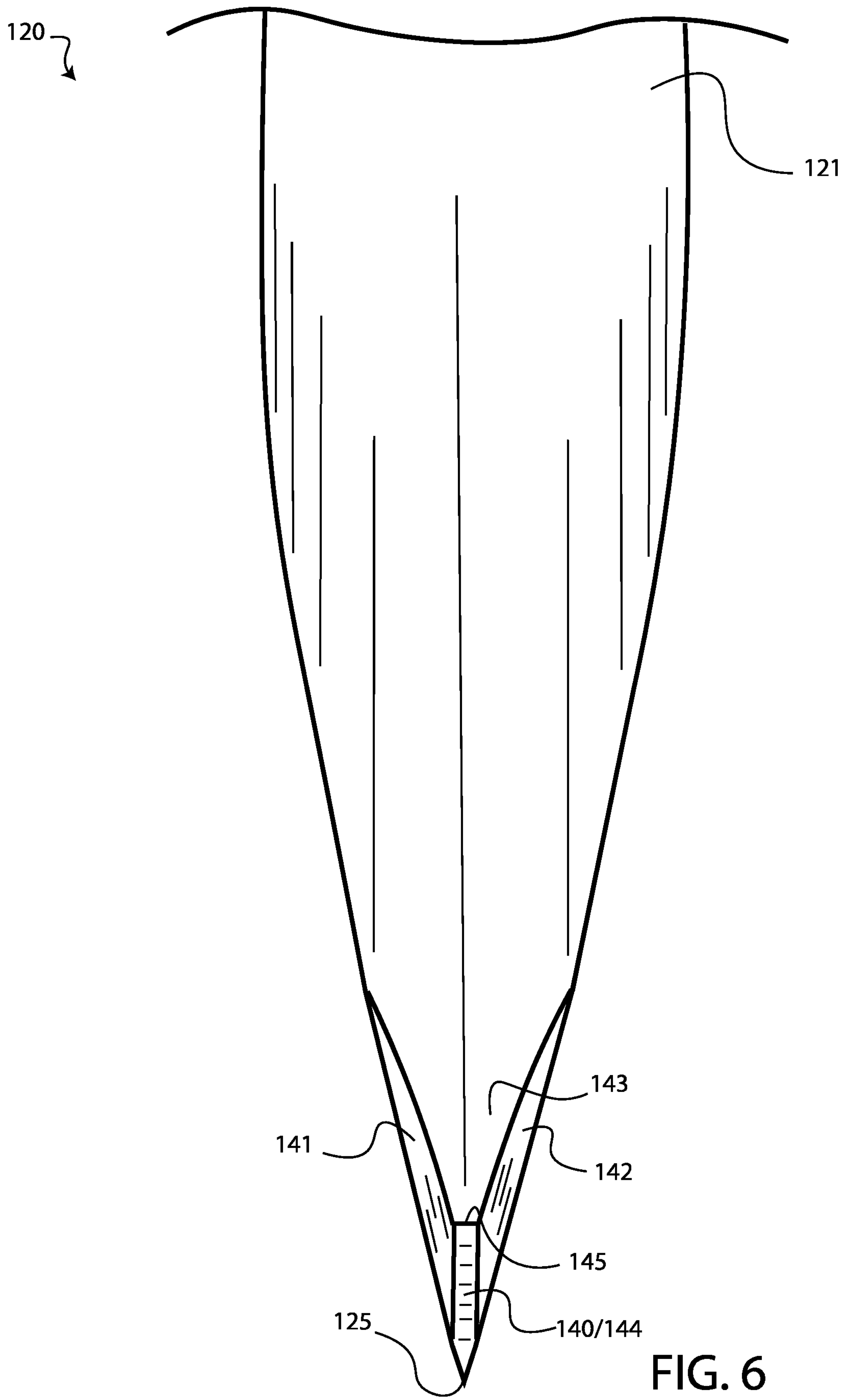
FIG. 6 is a back (e.g., rear) view of the blade portion of the cutting tool, as observed from the perspective of the arrow labeled "6" in FIG. 3, in accordance with various embodiments.

In various embodiments, and with continued reference to FIG. 3, the blade portion 120 of the cutting tool 100 also includes a back edge 140. The back edge 140 extends rearwards and proximally from the tip 125, according to various embodiments. That is, the back edge 140 may extend at an angled orientation from the tip 125 to the back edge end 145. The back edge 140 may extend in a straight line between the tip 125 and the back edge end 145. In various embodiments, and with momentary reference to the back view of FIG. 6, the back edge 140 of the blade portion 120 may be a non-sharp edge and may thus be referred to herein as a spine or spine section 144. The back edge 140 of the blade portion 120 may be a planar surface. In various embodiments, two opposing chamfer surfaces 141, 142 (FIG. 6) may terminate at the back edge 140. Accordingly, the back edge 140 may comprise a planar, non-sharp surface, or the back edge 140 may be formed by the two chamfer surfaces 141, 142 terminating along a common edge, which may be sharp, as described in greater detail below with reference to FIG. 6.

In various embodiments, the back edge 140 of the blade portion 120 extends in a straight line from the tip 125 and terminates at the back edge end 145. In various embodiments, the angle between the longitudinal centerline axis 105 and the back edge 140, referred to herein as the back edge angle 146, is between about 5 degrees and about 25 degrees. In various embodiments, the back edge angle 146 is about 15 degrees. As used in this context pertaining to the back edge angle 146, the term "about" means plus or minus 2 degrees. In various embodiments, the angle between the knife edge 130 and the back edge 140, referred to herein as the tip angle 155, is between about 35 degrees and 75 degrees. In various embodiments, the tip angle 155 is about 55 degrees. As used in this context pertaining to the tip angle 155, the term "about" means plus or minus 5 degrees.

In various embodiments, and with reference to FIG. 3, a second height 147 of the back edge 140, defined as a dimension of the back edge 140 along the longitudinal centerline axis 105, is between about 20% and about 50% of the cross-sectional dimension 122 of the ricasso 121. In various embodiments, the second height 147 of the back edge 140 is about 35% of said cross-section dimension 122. As used in this context pertaining to the second height 147, the term "about" means plus or minus 5% of said cross-sectional dimension. In various embodiments, the second height 147 of the back edge 140 is less than 50% of the first height 137 of the knife edge 130. In various embodiments, the second height 147 is about 33% of the first height 137. As used in this context pertaining to the first and second heights, the term "about" means plus or minus 5% of the first height 137. In various embodiments, and with continued reference to FIG. 3, the second height 147 of the back edge 140 is between about 0.20 mm and about 0.50 mm. In various embodiments, the second height 147 of the back edge 140 is about 0.35 mm. As used in this context pertaining to the second height 147, the term "about" means plus or minus 0.05 mm.

In various embodiments, and with reference to FIGS. 3 and 4, the chamfer surfaces 141, 142 (also referred to herein as first chamfer surface 141 and second chamfer surface 142) intersect the respective grind surfaces 131, 132 (also referred to herein as the first grind surface 131 and the second grind surface 132). The chamfer surfaces 141, 142 are in proximity to the tip 125 of the blade portion 120. Said differently, the chamfer surfaces 141, 142 may be disposed adjacent the tip 125 of the blade. For example, the chamfer surfaces 141, 142 may intersect the respective grind surfaces 131, 132 that define the knife edge 130.

Figure 5:
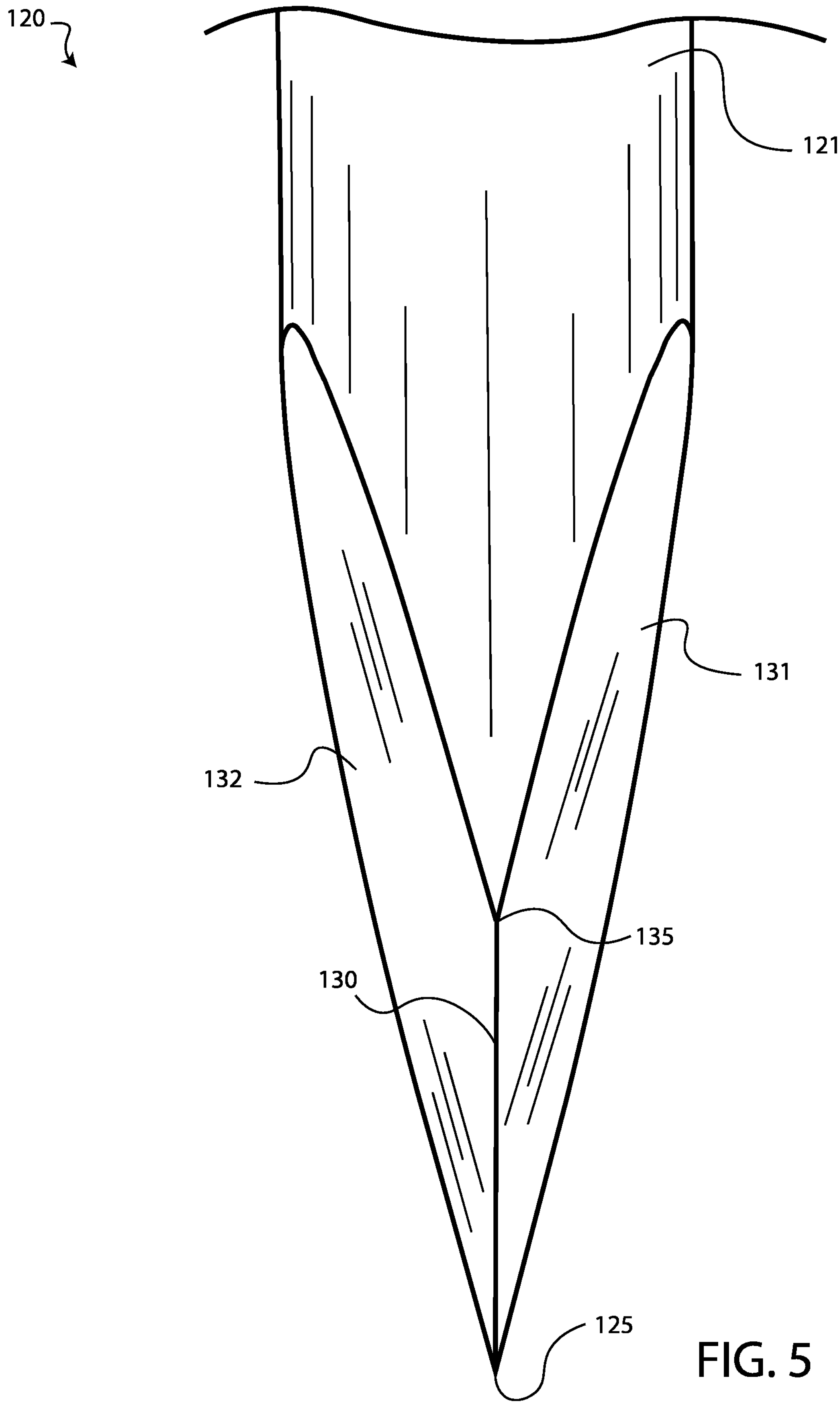
FIG. 5 is a front view of the blade portion of the cutting tool, as observed from the perspective of the arrow labeled "5" in FIG. 3, in accordance with various embodiments.

In various embodiments, and with specific reference to the cross-sectional view of FIG. 4, anything facing the bottom half of the page may be referred to herein as facing the forward or front half of the cutting tool 100 while anything facing the top half of the page may be referred to here as facing the rearward or back half of the cutting tool 100. Accordingly, the grind surfaces 131, 132 may face the front half of the blade portion 120 (e.g., see FIG. 5) and the chamfer surfaces 141, 142 may face the back half of the blade portion 120 (e.g., see FIG. 6). Thus, the chamfer surfaces 141, 142 may transition the front facing grind surfaces 131, 132 to the back edge 140 and/or to the ricasso 121.

In various embodiments, the chamfer surfaces 141, 142 do not intersect each other, but instead terminate at the back edge 140 and/or terminate at edges that define one or more spine sections on the back of the blade portion 120. For example, and with momentary reference to FIG. 6, a back-distal portion of the chamfer surfaces 141, 142 terminate at the back edge 140, and this back edge 140 (described above) may be referred to herein as a spine section 144. In various embodiments, a back-proximal portion of the chamfer surfaces 141, 142 terminate at the ricasso 121 (e.g., which may have a cylindrical outer surface). In such embodiments, another spine section 143 may be disposed between the respective proximal portions of the chamfer surfaces 141, 142, and this spine section may have a curved exterior surface (e.g., the cylindrical surface of the ricasso 121 may extend distally between the proximal portions of the chamfer surfaces 141, 142). Accordingly, the cutting tool 100 may include two spine sections 143, 144 disposed on the back side 104 of the blade portion 120 between the chamfer surfaces 141, 142. A first spine section 143 may have a curved exterior surface (e.g., conforming to the curvature of the ricasso 121) and a second spine section 144, distally disposed relative to the first spine section 143, may have a flat/planar exterior surface. The second spine section 144 may extend between the tip 125 and the back edge end 145 (discussed above), and thus the second spine section 144 may be the back edge 140.

In various embodiments, and with renewed reference to FIG. 3, the chamfer surfaces 141, 142 may not intersect the knife edge 130 (only the grind surfaces themselves 131, 132). Said differently, the chamfer surfaces 141, 142 may be entirely rearward of the tip 125. The chamfer surfaces 141, 142 may extend to the tip 125 of the blade, or the chamfer surfaces 141, 142 may terminate proximal of the tip 125. For example, and according to various embodiments, the chamfer surfaces 141, 142 may not extend to the tip 125 of the blade portion 120, and thus distal-most portions of the respective chamfer surfaces 141, 142 may be offset a setback distance 149, as measured along the longitudinal centerline axis 105, from the tip 125. In various embodiments, the setback distance 149 may be about 0.025 mm. In other embodiments, the setback distance 149 is between about 0.00 mm and about 0.13 mm. In various embodiments, the setback distance is about 0.08 mm. As used in this context pertaining to the setback distance 149, the term "about" means plus or minus 0.025 mm.

In various embodiments, and with reference to FIG. 3, a third height 148 of the chamfer surface(s) 141, 142, defined as a dimension of the chamfer surface(s) 141, 142 along the longitudinal centerline axis 105, is between about 70% and about 100% of the cross-sectional dimension 122 of the ricasso 121. In various embodiments, the third height 148 is about 85% of said cross-sectional dimension 122. As used in this context pertaining to the third height 148, the term "about" means plus or minus 5% of the cross-sectional dimension 122. In various embodiments, the third height 148 of the chamfer surface(s) 141, 142 is between about 0.70 mm and about 1.00 mm. In various embodiments, the third height 148 is about 0.85 mm. As used in this context pertaining to the third height 148, the term "about" means plus or minus 0.05 mm. In various embodiments, the third height 148 of the chamfer surface(s) 141, 142 is less than the first height 137 of the knife edge 130. In various embodiments, the third height 148 is more than 50% of the first height 137. In various embodiments, the third height 148 of the chamfer surface(s) 141, 142 is between 50% and 90% of the first height 137 of the knife edge 130. Said differently, the chamfer surface(s) 141, 142 may be entirely disposed within the 'height footprint' of the knife edge 130. That is, the choil 135 may be more proximal than the proximal-most portion of the chamfer surface(s) 141, 142 and/or the tip 125 may be more distal than the distal-most portion of the chamfer surface(s) 141, 142 hink we are OK. In various embodiments, the third height 148 is about 80% of the first height 137. As used in this context pertaining to the first and third heights, the term "about" means plus or minus 5% of the first height 137.

The cross-sectional view shown in FIG. 4 is a view of the blade portion 120 from the perspective labeled "4" in FIG. 3. This sectional view 4 is along a plane that is perpendicular to the longitudinal centerline axis 105. As shown in FIG. 4, angles of various surfaces are provided as measured in this reference plane/section that is orthogonal to the longitudinal centerline axis 105 of the cutting tool 100. Also, FIG. 4 shows "exterior surface angles" which are defined as the external angle between respective surfaces. To find the corresponding internal angles (i.e., the angles between respective surfaces that are within the body of the cutting tool 100), the listed/disclosed exterior surface angles should be subtracted from 360.

In various embodiments, a first exterior surface angle 161, defined as the angle between respective outwardly facing surfaces of the grind surface 131 and the chamfer surface 141, is between about 210 degrees and 270 degrees. In various embodiments, the first exterior surface angle 161 is between about 225 degrees and about 255 degrees. In various embodiments, the first exterior surface angle 161 is about 239.8 degrees. As used in this context pertaining to the first exterior surface angle 161, the term "about" means plus or minus 2.0 degrees.

In various embodiments, a second exterior surface angle 162, defined as the angle between respective outwardly facing surfaces of the two grind surfaces 131, 132, is between about 300 degrees and about 345 degrees. In various embodiments, the second exterior surface angle 162 is between about 316 degrees and about 340 degrees. In various embodiments, the second exterior surface angle 162 is about 328.8 degrees. As used in this context pertaining to the second exterior surface angle 162, the term "about" means plus or minus 2.0 degrees.

In various embodiments, a third exterior surface angle 163, defined as the angle between respective outwardly facing surfaces of the two chamfer surfaces 141, 142, is between about 240 degrees and 300 degrees. In various embodiments, the third exterior surface angle 163 is between about 255 degrees and about 285 degrees. In various embodiments, the third exterior surface angle 163 is about 271.5 degrees. As used in this context pertaining to the third exterior surface angle 163, the term "about" means plus or minus 2.0 degrees.

The numerous details included herein pertaining to the relative position, relative orientation, dimensions, and general configuration of the chamfer surface(s) 141, 142 relative to the rest of the blade portion 120 of the cutting tool 100 are especially important, as the chamfer surface(s) 141, 142 impart various advantages to the cutting tool that would not exist if not for the chamfer surface(s) 141, 142. Said differently, by having the chamfer surface(s) 141, 142 intersecting the grind surface(s) 131, 132 in the manners described herein and/or by having the chamfer surface(s) 141, 142 disposed at the transition from the front side of the blade to the back of the blade, the blade portion 120 of the cutting tool 100 enables quick and clean cutting while also allowing improving the strength and breakage-resistance of the tool. For example, the various heights, the various height relationships, the various angles, and/or the relative angles between respective surfaces generally enable the improved performance of the cutting tool 100. That is, the chamfer surface(s) 141, 142 are able to provide increased cutting efficiency by improving blade strength (inhibiting breakage) and improving edge endurance (inhibiting premature tip/knife edge degradation). Without the chamfer surface(s) 141, 142, the knife edge 130, the tip 125, the back edge 140 would have an increased susceptibility to chipping and other forms of particle liberation. Accordingly, the presently disclosed geometry of the cutting tool 100 extends the life span of the blade portion, providing users with a noticeable increase in cutting usage/distance. This new geometry may also facilitate the ability of the blade to navigate sharp corners by rotating more easily (e.g., about the longitudinal centerline axis 105) and by enabling more precision and speed by reducing the surface area dragging against the material on the sides of the cut being made.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112 (f) unless the element is expressly recited using the phrase "means for."

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "some embodiments," "various embodiments," "one example," "an example," "some examples," "various examples," "one implementation," "an implementation," "some implementations," "various implementations," "one aspect," "an aspect," "some aspects," "various aspects," etc., indicate that the embodiment, example, implementation, and/or aspect described may include a particular feature, structure, or characteristic, but every embodiment, example, implementation, and/or aspect may not necessarily include the particular feature, structure, or characteristic. Moreover, such phrases are not necessarily referring to the same embodiment, example, implementation, or aspect. Thus, when a particular feature, structure, or characteristic is described in connection with an embodiment, example, implementation, and/or aspect, it is submitted that it is within the knowledge of one skilled in the art to affect such feature, structure, or characteristic in connection with other embodiments, examples, implementations, and/or aspects, whether or not explicitly described. Absent an express correlation to indicate otherwise, features, structure, components, characteristics, and/or functionality may be associated with one or more embodiments, examples, implementations, and/or aspects of the present disclosure. After reading the description, it will be apparent to one skilled in the relevant art how to implement the disclosure in alternative configurations.

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

All ranges and ratio limits disclosed herein may be combined. Numbers, percentages, ratios, or other values stated herein are intended to include that value, and also other values that are "about" or "approximately" the stated value, as would be appreciated by one of ordinary skill in the art encompassed by embodiments of the present disclosure, unless otherwise defined herein. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, one element being "coupled" to another may refer to two separate components that are connected or joined together, or may refer to different sections, segments, or portions of an integrated/monolithic structure that extend relative to each other or that have some other contrasting features, shapes, properties, or the like. Also, as used herein, securing one element to another element can include direct securing and indirect securing. Additionally, as used herein, "adjacent" does not necessarily denote contact. For example, one element can be adjacent another element without being in contact with that element.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A cutting tool comprising a longitudinal axis and a blade portion forming a distal end of the cutting tool, the blade portion comprising:

a tip that is a distal-most point of the cutting tool;

a knife edge defined by an intersection between a first grind surface and a second grind surface, wherein the knife edge extends in a proximal-forward direction from the tip;

a spine section extending in a proximal-rearward direction from the tip;

a first chamfer surface that intersects the first grind surface and the spine section; and a second chamfer surface that intersects the second grind surface and the spine section.

2. The cutting tool of claim 1, wherein the knife edge is opposite the spine section.

3. The cutting tool of claim 2, wherein the proximal-forward direction and the proximal-rearward direction are coplanar.

4. The cutting tool of claim 1, wherein the knife edge extends linearly between the tip and a choil.

5. The cutting tool of claim 4, wherein the spine section extends linearly between the tip and a back edge end.

6. The cutting tool of claim 5, wherein a tip angle defined between the knife edge and the spine section is between about 35 degrees and about 75 degrees.

7. The cutting tool of claim 4, wherein the first chamfer surface and the second chamfer surface are entirely disposed within a height footprint of the knife edge such that the choil is more proximal than the proximal-most portion of the first chamfer surface and the second chamfer surface and the tip is more distal than the distal-most portion of the first chamfer surface and the second chamfer surface.

8. The cutting tool of claim 1, wherein a height of the first chamfer surface and the second chamfer surface along the longitudinal axis is less than a height of the knife edge along the longitudinal axis.

9. The cutting tool of claim 1, wherein each of the first grind surface and the second grind surface is planar.

10. The cutting tool of claim 1, wherein each of the first chamfer surface and the second chamfer surface is planar.

11. The cutting tool of claim 1, wherein at least a portion of the first chamfer surface and at least a portion of the second chamfer surface do not intersect each other and the spine section is disposed between and directly adjacent said portion of the first chamfer surface and said portion of the second chamfer surface.

12. The cutting tool of claim 1, wherein the spine section comprises a portion that has a planar exterior surface and another portion that has a curved exterior surface.

13. The cutting tool of claim 1, wherein the spine section comprises a portion that has a flat exterior surface and another portion that has a curved exterior surface.

* * * * *